(12) United States Patent
Santiago

(10) Patent No.: US 10,838,743 B2
(45) Date of Patent: *Nov. 17, 2020

(54) SYSTEMS AND METHODS FOR PROCESSING EXTENSIBLE MARKUP LANGUAGE DATA DURING RUNTIME

(71) Applicant: MASTERCARD INTERNATIONAL INCORPORATED, Purchase, NY (US)

(72) Inventor: Christopher Tomas Santiago, Piscataway, NJ (US)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/017,518

(22) Filed: Jun. 25, 2018

(65) Prior Publication Data

US 2018/0307505 A1 Oct. 25, 2018

Related U.S. Application Data

(63) Continuation of application No. 15/063,610, filed on Mar. 8, 2016, now Pat. No. 10,031,766.

(51) Int. Cl.
*G06F 8/30* (2018.01)
*G06F 9/445* (2018.01)

(52) U.S. Cl.
CPC ............ *G06F 9/44521* (2013.01); *G06F 8/30* (2013.01)

(58) Field of Classification Search
CPC .............................. G06F 9/44521; G06F 8/30
See application file for complete search history.

(56) References Cited

U.S. PATENT DOCUMENTS

| | | |
|---|---|---|
| 7,130,862 B2 | 10/2006 | Easton |
| 7,373,595 B2 | 5/2008 | Jones et al. |
| 7,437,374 B2 | 10/2008 | Chen et al. |
| 7,467,149 B2 | 12/2008 | Gaurav et al. |
| 7,493,603 B2 | 2/2009 | Fuh et al. |
| 7,505,988 B2 | 3/2009 | Betts et al. |
| 7,822,786 B2 | 10/2010 | Charlet et al. |
| 7,890,479 B2 | 2/2011 | Chen et al. |
| 7,962,925 B2 | 6/2011 | Fry et al. |
| 7,970,730 B2 | 6/2011 | Meijer et al. |
| 8,069,435 B1 | 11/2011 | Lai |
| 8,799,860 B2 | 8/2014 | Zheng |

(Continued)

*Primary Examiner* — Wei Y Zhen
*Assistant Examiner* — Amir Soltanzadeh
(74) *Attorney, Agent, or Firm* — Armstrong Teasdale LLP

(57) ABSTRACT

A method for dynamically loading one or more Extensible Mark-up Language (XML) schema definition (XSD) files into a JAVA™ Virtual Machine (JVM) during runtime is provided. The method includes generating JAVA™ objects from one or more initial XSD files. The method further includes grouping the JAVA™ objects by namespaces. The method also includes creating new XSD files for the namespaces. The new XSD file includes references to the initial XSD files that include a same namespace. The method further includes generating JAVA™ classes from the new XSD files. The method also includes compiling the new JAVA™ classes into bytecode. The bytecode is loaded into a ClassLoader, wherein the ClassLoader is available to the JVM during runtime.

18 Claims, 2 Drawing Sheets

(56) References Cited

U.S. PATENT DOCUMENTS

| | | |
|---|---|---|
| 9,092,466 B1 | 7/2015 | Van Rotterdam et al. |
| 2005/0114394 A1 | 5/2005 | Kaipa et al. |
| 2005/0177543 A1 | 8/2005 | Chen et al. |
| 2006/0041838 A1 | 2/2006 | Khan |
| 2008/0104592 A1* | 5/2008 | Heifets .................. G06F 9/445 718/1 |
| 2008/0195622 A1 | 8/2008 | Lelcuk et al. |
| 2009/0144714 A1 | 6/2009 | Fan et al. |
| 2011/0184990 A1* | 7/2011 | Murphy .................. G06F 8/20 707/791 |
| 2013/0204910 A1 | 8/2013 | Sawant et al. |

* cited by examiner

SYSTEMS AND METHODS FOR PROCESSING EXTENSIBLE MARKUP LANGUAGE DATA DURING RUNTIME

CROSS-REFERENCE TO RELATED APPLICATIONS

This application is a continuation application of U.S. patent application Ser. No. 15/063,610, filed Mar. 8, 2016, entitled "SYSTEMS AND METHODS FOR PROCESSING EXTENSIBLE MARKUP LANGUAGE DATA DURING RUNTIME", the disclosure of which is hereby incorporated by reference in its entirety.

BACKGROUND OF THE DISCLOSURE

The field of the disclosure relates generally to data conversions and, more particularly, to a network-based system and method for dynamically processing and loading data in an Extensible Markup Language (XML) format into a virtual computing machine configured to run a JAVA™ program during runtime.

To communicate with one another, computers use various protocols and message formats. The Extensible Markup Language, otherwise known as XML, has become a standard for data transmission and inter-application communication. XML is a markup language that defines a set of rules for encoding files in a format which is both human-readable and machine-readable. XML data can be readily transmitted between computers using any type of data transmission media. XML data can be processed using computer programs and other suitably configured applications.

A XML file is generally required to conform to a particular standard to ensure that the XML file can be easily exchanged and understood between multiple independent parties. To ensure that the XML file conforms to a standard, the XML file may be validated against a XML schema. The XML schema is a set of rules to which a XML file must conform if it is to be considered valid (i.e., the file conforms to the standard). The XML schema defines the structure, constraints, data types, and relationships of the data elements that constitute data contained inside the XML file.

The XML Schema definition language (XSD) is the current World Wide Web Consortium (W3C) specification for XML schemas. An XSD file defines a type of XML file in terms of constraints upon what elements and attributes may appear, the relationship between the elements and the attributes, what types of data may be included, and other things.

Since the processing of XML has become a standard function in many computing environments, it is often necessary to receive data from a XML file and transform the data such that the data can be handled by a JAVA™ Virtual Machine (JVM). The JVM is an abstract computing machine that enables a computer to run a JAVA™ program. XML data binding involves binding the schema for a XML file into a set of JAVA™ classes that represents the schema and can be executed on the JVM. One method that is useful for XML data binding is the JAVA™ Architecture for Data Binding (JAXB), which compiles an XML schema into JAVA™ classes. These generated classes also ensure that the constraints expressed in the schema are enforced in the resulting methods and JAVA™ language data types.

When using XML data binding for data format conversions, typically the data structures that will be used for data binding are defined and added to the code during compile time. Any changes to the existing data structures or addition of new data structures requires code modification and recompilation, followed by a redeployment of the code in a production environment. However, this recompilation and redeployment of the code is problematic for high-traffic, high-availability computing systems.

Therefore, in an effort to avoid this recompilation and redeployment of the code, new systems and methods are needed to communicate new data structures and modifications to existing data structures during runtime.

BRIEF DESCRIPTION OF THE DISCLOSURE

A method for dynamically loading one or more Extensible Mark-up Language (XML) schema definition (XSD) files into a JAVA™ Virtual Machine (JVM) during runtime is provided. The method includes generating JAVA™ objects from one or more initial XSD files. The method also includes identifying namespaces within the JAVA™ objects. The method further includes grouping the JAVA™ objects by namespaces. The method also includes creating new XSD files for the namespaces. The new XSD files include references to the initial XSD files that include a same namespace. The method further includes generating JAVA™ classes from the new XSD files. The method also includes compiling the new JAVA™ classes into bytecode. The method further includes storing the bytecode into a memory. The method also includes receiving, from the memory, the bytecode. The bytecode is loaded into a ClassLoader. The ClassLoader is available to the JVM during runtime.

A system for dynamically loading one or more Extensible Mark-up Language (XML) schema definition (XSD) files into a JAVA™ Virtual Machine (JVM) during runtime is provided. The system includes a processor coupled to a memory and a network. The processor is configured to generate JAVA™ objects from one or more initial XSD files. The processor is also configured to identify namespaces within the JAVA™ objects. The processor is further configured to group the JAVA™ objects by namespaces. The processor is also configured to create new XSD files for the namespaces. The new XSD files include references to the initial XSD files that include a same namespace. The processor is further configured to generate JAVA™ classes from the new XSD files. The processor is also configured to compile the new JAVA™ classes into bytecode. The processor is further configured to store the bytecode into a memory. The processor is also configured to receive, from the memory, the bytecode. The bytecode is loaded into a ClassLoader. The ClassLoader is available to the JVM during runtime.

A non-transitory computer readable medium that includes computer executable instructions for dynamically loading one or more Extensible Mark-up Language (XML) schema definition (XSD) files into a JAVA™ Virtual Machine (JVM) during runtime is provided. When executed by a user computing device with a processor in communication with a memory, the computer executable instructions cause the user computing device to generate JAVA™ objects from one or more initial XSD files. The computer executable instructions also cause the user computing device to identify namespaces within the JAVA™ objects. The computer executable instructions further cause the user computing device to group the JAVA™ objects by namespaces. The computer executable instructions also cause the user computing device to create new XSD files for the namespaces. The new XSD files include references to the initial XSD files that include a same namespace. The computer executable instructions further cause the user computing device to generate JAVA™ classes from the new XSD files. The computer executable instructions also cause the user computing device to compile the new JAVA™ classes into bytecode. The computer executable instructions further cause the user computing device to store the bytecode into a memory. The computer executable instructions also cause the user computing device to receive, from the memory, the bytecode. The bytecode is loaded into a ClassLoader. The ClassLoader is available to the JVM during runtime.

BRIEF DESCRIPTION OF THE DRAWINGS

FIG. 1 is a flow chart of an example system and method to dynamically process and load XML-based data into a JAVA™ Virtual Machine (JVM) during runtime; and FIG. 2 is a block diagram of the system and method described in FIG. 1 applied to a server for handling XML files.

DETAILED DESCRIPTION OF THE DISCLOSURE

Figure 1:
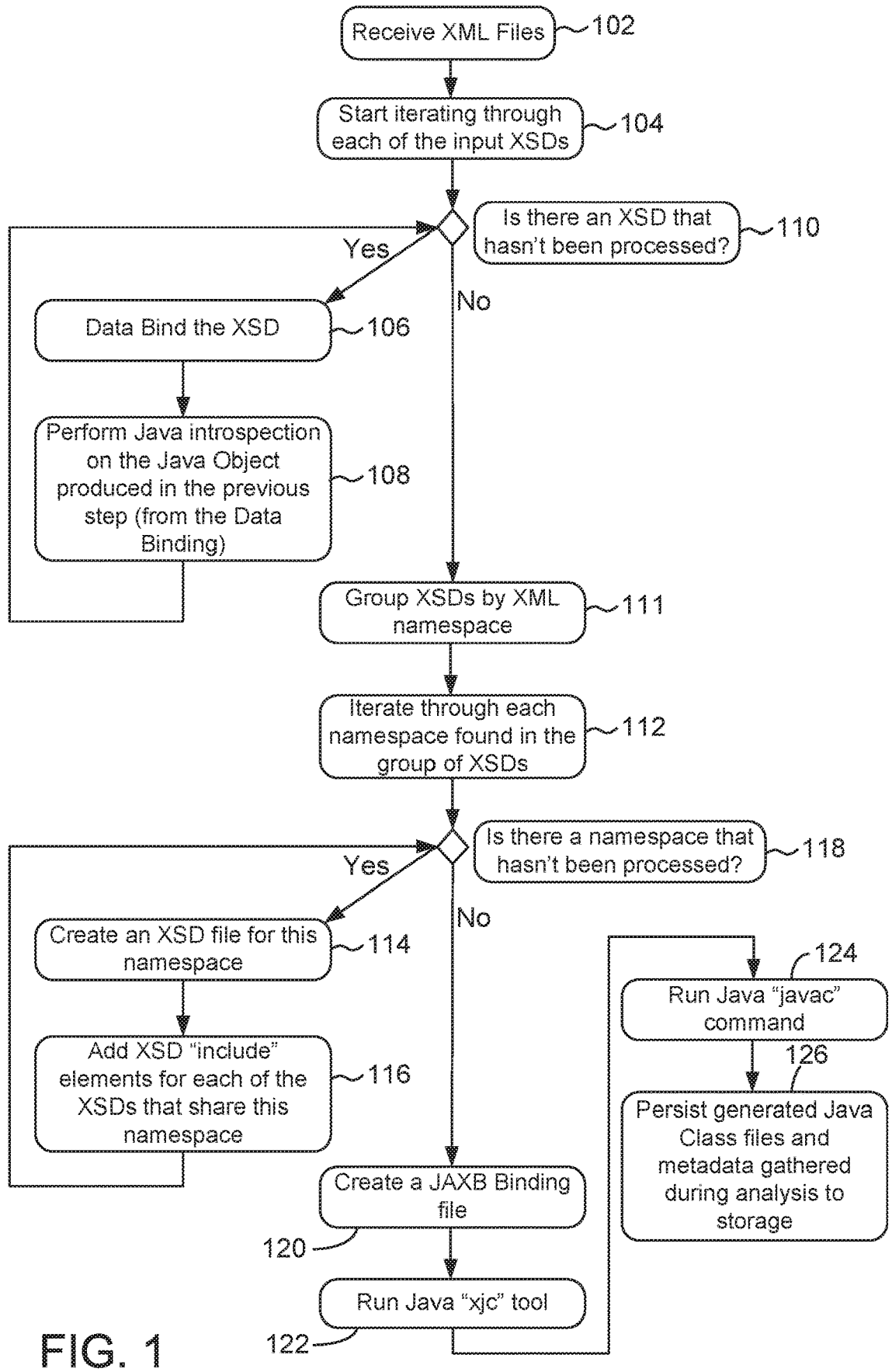
FIGS. 1 and 2 show example embodiments of the methods and systems described herein.

A system and method for dynamically processing and loading XML-based data into a JAVA™ Virtual Machine (JVM) during runtime is provided. The XML processing system includes at least a processing component for processing XSD files, a namespace processing component for processing the namespaces of the XSD files, and a compiling component for generating and packaging JAVA™ classes from the XSD files. The XML, processing system is configured to receive at least one XML file or XSD file through a frontend interface, such as a web interface or a command line tool, which is coupled to at least one computing device. The XML processing system converts the XML-based data into JAVA™ bytecode. The XML processing system includes at least a schema compiler to generate JAVA™ bindings from an XML schema file and a JAVA™ compiler for compiling JAVA™ code into byte codes that may be executed by the JVM.

The methods and systems described herein may be implemented using computer programming or engineering techniques including computer software, firmware, hardware or any combination or subset thereof, wherein the technical effect is achieved by performing at least one of: (a) iterating through the XML files; (b) converting XSD files to JAVA™ objects using data binding; (c) performing JAVA™ introspection and reflection on the JAVA™ objects; (d) grouping the XSD files by XML namespace; and (d) converting the XML-based data into JAVA™ bytecode. The technical effects described herein apply to the technical field of processing and loading XML-based data into a JVM during runtime. The systems and methods described herein provide the technical advantage of avoiding recompilation and redeployment of code and communicating new data structures and modifications to existing data structures during runtime.

In one embodiment, a computer program is provided, and the program is embodied on a computer-readable medium. In an example embodiment, the system is executed on a single computer system, without requiring a connection to a sever computer. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of The Open Group).

The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

The following detailed description illustrates embodiments of the disclosure by way of example and not by way of limitation. It is contemplated that the disclosure has general application to networks in industrial, commercial, and residential applications.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

FIG. 1 is a flow chart of an example method to dynamically process and load XML-based data into a JVM (JAVA™ Virtual Machine) during runtime. The XML processing system receives a plurality of XML files through the frontend interface (block 102), such as a web interface, a command line tool, or an application. In some embodiments, XSD files are received by the XML processing system and the step, described below, of converting the XML files to XSD files is omitted.

The XSD processing component iterates through the received XML files (block 104), converting each XML file into a W3C XML Schema Definition (XSD) file (block 106). XSD is a standards-based format of the W3C (World Wide Web Consortium) for defining a structure of XML data. The XSD processing component further converts the XSD files to JAVA™ objects using a data binding library (e.g., JAXB, Jackson, Moxy, etc.).

The JAVA™ objects enables each XSD file to be handled in an object-oriented manner without text parsing the XSD file. This allows for ease of building metadata information from the XSD files as well as adding metadata gathered in the future. The object-oriented approach further avoids potential issues associated with writing an XSD parser in order to properly parse and record relationships and structures defined in the XSD files. As explained further below, the object-oriented approach is also particularly useful in tracing the relationships between structures defined in the XSD files.

A XSD file may reference other XSD files; for example, two XSD files may have different namespaces but reference each other. Converting a XSD file to a JAVA™ object only instantiate the internal references within the XSD file. However, if the XSD file includes an external reference to one or more other XSD files, the conversion from the XSD file to the JAVA™ object will not instantiate the external references to the other XSD files.

Accordingly, the XSD processing component performs JAVA™ introspection and reflection on the JAVA™ objects (block 108). JAVA™ introspection involves obtaining internal information of a JAVA™ class at run-time. This information includes inheritances, methods, class fields, constructors, and so on. JAVA™ Reflection is used to find relationships between the JAVA™ objects (i.e., the instantiated XSD files) to recursively trace and resolve references in the JAVA™ objects.

When XSD data is converted to JAVA™ objects, references between JAVA™ objects from within the same XSD file and between objects from separate XSD files are specified using a specific JAVA™ data type named QName. The QName reference is a JAVA™ representation of an XSD element reference to another XSD type definition. All references in a defined structure and data type to other defined structures and data types are represented after data binding as a JAVA™ QName data type.

The XSD processing component uses JAVA™ Reflection to traverse the XSD files and gather all data types that are of JAVA™x.xml.namespace.QName. JAVA™ Reflection traces this QName reference to one of the other instantiated XSD types. This reference tracing builds a parent/child relationship tree, forming the relationships between the instantiated XSD types within the XSD file and between different XSD files. The framework also validates the XSD files, such that validation will fail if the external reference cannot be resolved.

While recursively tracing the references in the objects, the XSD processing component also records any required metadata, such as namespace information, root elements, and top-level elements. The XSD processing component iterates through the XML files (block 110), continuing the above process for each XML file until all the XML files have been converted to JAVA™ objects and the relationships traced.

Issues arise when two or more different XML files utilize identical elements or identical attribute names to describe different (non-compatible) data. These issues are typically avoided by using namespaces. When a particular element or attribute is described in a XML file, the element or attribute is attributed a unique namespace to ensure that it is not confused with an element or attribute from another file.

Building the parent/child relationship tree involves determining namespaces for the xml elements. The namespace processing component uses the gathered metadata to determine the unique namespaces and pointers from that namespace to an originating XSD file for that namespace. Where elements definitions are provided across multiple XSD files with different namespaces, the XSD files are related and should be handled as being part of a same group, but should be grouped into different JAVA™ package names based on the namespaces (block 111). For example, given three XSD files, (i) XSD1 with namespace1, (iii) XSD2 with namespace2, and (iii) XSD3 with namespace2, files XSD2 and XSD3 are packaged in a same JAVA™ package since they share the same namespace, while XSD1 is located in a separate JAVA™ package. The generated JAVA™ packages may appear as (i) XSD1—namespace1—com.company.generated.ns1, (ii) XSD2—namespace2—com.company.generated.ns2, and (iii) XSD3—namespace3—com.company.generated.ns2.

The compiling component uses JAVA™ Architecture for XML Binding (known as JAXB), which is a specification (or standard) that automates a mapping between XML files and JAVA™ objects. JAXB includes an xjc schema binding compiler. The xjc binding compiler compiles an XML schema file into JAVA™ classes and the JAXB groups the generated classes into JAVA™ packages. The compiling component uses the xjc binding compiler to generate JAVA™ classes from the XSD files and JAXB to group the JAVA™ classes into JAVA™ packages based on the XML namespaces.

However, the xjc specification does not allow generating a JAVA™ package from multiple XSD files that define the same namespace. Therefore, the namespace processing component assists in packaging the JAVA™ classes by auto-generating a new XSD file that only contains "include" elements referencing the instantiated XSD files that share the same namespace. Thus, there is a new XSD file auto-generated for every namespace found in the instantiated XSD file group. The "include" element enables all of the definitions from multiple XSD files that share the same namespace to be pulled into the definition of a XSD file during processing. This effectively groups XSD files with the same namespace into one XSD file, which is acceptable to the xjc compiler, without modifying any of the XSD files.

The namespace processing component iterates through each namespace found in the JAVA™ objects (block 112). If there is a namespace that has not been processed, the namespace processing component creates a new XSD file for that namespace (block 114), and add "include" elements for each of the instantiated XSD files that share the namespace (block 116). The namespace processing component creates a new XSD file for each namespace, with the new XSD file including references to all of the original XSD files that include the namespace. Once all namespaces have been processed (block 118), the compiling component creates a JAXB binding file (block 120), and creates entries in the JAXB binding file for each of the newly generated XSD files.

With the newly generated XSD files and the generated JAXB binding file, the compiling component runs, without error, the xjc tool (block 122) and generates and packages JAVA™ classes from the new XSD files that share the same namespace. The compiling component runs a JAVA™ "JAVA™c" command to compile the JAVA™ classes into JAVA™ bytecodes (block 124), which is used as input for the JAVA™ Virtual Machine (JVM). The JAVA™ bytecode may be transmitted to a backend server, which is in communication with a network.

The compiling component stores the generated bytecode for the JAVA™ classes and gathered metadata to a database (block 126), such as a storage device. Execution of the JAVA™c command and the xjc tool are automated and occur during runtime, as opposed to normally occurring during compile-time.

The database is accessible to a proxy component that will be using the JAVA™ classes. The metadata is also stored in the database so that the proxy component, when pulling the bytecode out of the database, has information about the bytecode. The proxy component may periodically poll or receive an event for newly generated JAVA™ classes added to the database. For example, the proxy component may have an internal clock where every 15 minutes a process inside the proxy component will scan the database and, based on timestamps of records in the database, verify whether new definitions are present.

Any code loaded into the JVM is associated with a ClassLoader. Within memory, the ClassLoader points to binaries loaded out of the database. When at least one generated JAVA™ class is found, a new ClassLoader is created. The proxy component then loads the bytecode from the database into a new instance of a ClassLoader (a new ClassLoader instance is created for each refresh of the generated JAVA™ classes in the JVM). The new ClassLoader instance is used with data binding libraries (e.g., JAXB, Jackson, Moxy, etc.) to bind and serialize data. This enables the JAVA™ classes to be available to the already-running JVM.

Classes in the older ClassLoaders must be dereferenced in order for JAVA™ Garbage Collection to properly reclaim memory related to older classes and older ClassLoaders; otherwise, there will be a permanent memory leak.

It is understood that each block shown in the diagrams (i.e., block diagram and/or flowchart diagram), and combinations of blocks in the diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the diagram block or blocks.

These computer program instructions may be stored in a computer-readable memory that can direct a computer or other programmable data processing apparatus to function in a particular manner, such that the instructions stored in the computer-readable memory produce an article of manufacture including instruction means which implement the function specified in the diagram block or blocks.

The computer program instructions may be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the diagram block or blocks.

Figure 2:
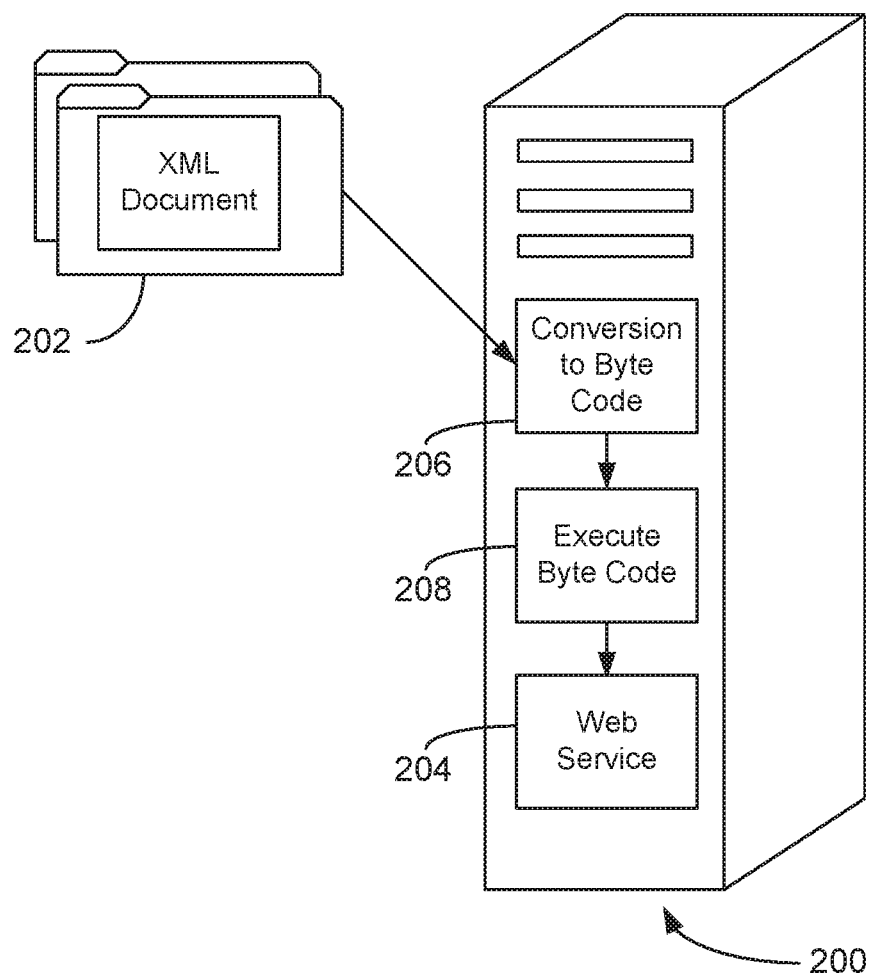

FIG. 2 is a block diagram showing the systems and methods described in FIG. 1 applied to a server for processing and loading XML-based data into a JVM (JAVA™ Virtual Machine) during runtime. Server 200, for example, a web service server, may receive XML document file 202. The systems and methods described herein can be used for dynamically performing XML data conversions on payloads sent to and received from a group of web services. XML document file 202 may be data intended as input for a web service 204 running on server 200.

The XML document file 202 is automatically converted into JAVA™ bytecode 206 and loaded into a new instance of a ClassLoader, as described in FIG. 1. The JAVA™ bytecode (i.e., JAVA™ classes) is executed 208 on the already-running JVM. Applications, for example, web services 204 may then execute the various functionality of the converted data structures.

In one or more embodiments, the systems and methods described herein are implemented at a proxy-level. For example, a proxy server, acting as an intermediary for a group of web services, automatically converts XML document file 202 for the web services. As a result, existing web services behind the proxy server do not require a code change to implement the data format conversion described in FIG. 1. Rather, the proxy server automatically converts inbound XML-based data into JAVA™-based data for web service consumption. In additional embodiments, as the proxy server processes each XSD file, the proxy server automatically perform data validation before routing to a destination web service.

The code may execute entirely on one or more servers, or it may execute partly on a server and partly on a client within a client device or as a proxy server at an intermediate point in a communications network. In the latter scenario, the client device may be connected to a server over a LAN or a WAN (e.g., an intranet), or the connection may be made through the Internet (e.g., via an Internet Service Provider).

It is understood that the present disclosure is not TCP/IP specific or Internet-specific. The present disclosure may be embodied using various protocols over various types of computer networks.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

As will be appreciated based on the foregoing specification, the above-discussed embodiments of the disclosure may be implemented using computer programming or engineering techniques including computer software, firmware, hardware or any combination or subset thereof. Any such resulting computer program, having computer-readable and/or computer-executable instructions, may be embodied or provided within one or more computer-readable media, thereby making a computer program product, i.e., an article of manufacture, according to the discussed embodiments of the disclosure. These computer programs (also known as programs, software, software applications or code) include machine instructions for a programmable processor, and can be implemented in a high-level procedural and/or object-oriented programming language, and/or in assembly/machine language. As used herein, the terms "machine-readable medium," "computer-readable medium," and "computer-readable media" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium," "computer-readable medium," and "computer-readable media," however, do not include transitory signals (i.e., they are "non-transitory"). The term "machine-readable signal" refers to any signal used to provide machine instructions and/or data to a programmable processor.

This written description uses examples, including the best mode, to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method comprising:
    identifying a namespace within each of a plurality of Extensible Mark-up Language (XML) schema definition (XSD) files;
    grouping the plurality of XSD files by namespaces, wherein each XSD file included in each group has the same namespace, and wherein the same namespace in each group is unique for each group;

creating a new XSD file for each group of the plurality of XSD files, wherein each new XSD file is created by including references to each of the plurality of XSD files sharing the same namespace;

generating, without modifying the plurality of XSD files, a plurality of new JAVA™ classes, wherein each of the plurality of new JAVA™ classes is generated from each new XSD file including the references to each of the plurality of XSD files sharing the same namespace;

compiling each new JAVA™ class into bytecode; and in response to compiling each new JAVA™ class into bytecode, dynamically loading the bytecode for each new JAVA™ class into a corresponding new instance of ClassLoader of a JAVA™ Virtual Machine (JVM) during runtime, wherein each new instance of ClassLoader is generated for each new JAVA™ class.

2. The method of claim 1 further comprising storing the bytecode into a memory.

3. The method of claim 1 further comprising searching for references in JAVA™ objects of a QName type to determine references to other XSD types.

4. The method of claim 1 further comprising:
generating JAVA™ objects from the plurality of XSD files using a data binding library; and
generating the plurality of XSD files from one or more XML files.

5. The method of claim 4 further comprising validating the one or more XML files against a XSD schema during runtime and reporting any discrepancies.

6. A system comprising:
a processor coupled to a memory and a network, said processor configured to:
identify a namespace within each of a plurality of Extensible Mark-up Language (XML) schema definition (XSD) files;
group the plurality of XSD files by namespaces, wherein each XSD file included in each group has the same namespace, and wherein the same namespace in each group is unique for each group;
create a new XSD file for each group of the plurality of XSD files, wherein each new XSD file is created by including references to each of the plurality of XSD files sharing the same namespace;
generate, without modifying the plurality of XSD files, a plurality of new JAVA™ classes, wherein each of the plurality of new JAVA™ classes is generated from each new XSD file including the references to each of the plurality of XSD files sharing the same namespace;
compile each new JAVA™ class into bytecode; and
in response to compiling each new JAVA™ class into bytecode, dynamically load the bytecode for each new JAVA™ class into a corresponding new instance of ClassLoader of a JAVA™ Virtual Machine (JVM) during runtime, wherein each new instance of ClassLoader is generated for each new JAVA™ class.

7. The system in accordance with claim 6, wherein said processor is further configured to
store the bytecode into a memory.

8. The system in accordance with claim 7, wherein each new JAVA™ class is generated using a XML To JAVA™ Compiler (xjc).

9. The system in accordance with claim 6, wherein a search for references in JAVA™ objects of a QName type is made to determine references to other XSD types.

10. The system in accordance with claim 6, wherein JAVA™ objects are generated from the plurality of XSD files using a data binding library, and wherein the plurality of XSD files are generated from one or more XML files.

11. The system in accordance with claim 10, wherein the one or more XML files are validated against a XSD schema during runtime and discrepancies are reported.

12. A non-transitory computer readable medium that includes computer-executable instructions wherein when executed by a user computing device with a processor in communication with a memory, the computer-executable instructions cause the user computing device to:
identify a namespace within each of a plurality of Extensible Mark-up Language (XML) schema definition (XSD) files;
group the plurality of XSD files by namespaces, wherein each XSD file included in each group has the same namespace, and wherein the same namespace in each group is unique for each group;
create a new XSD file for each group of the plurality of XSD files, wherein each new XSD file is created by including references to each of the plurality of XSD files sharing the same namespace;
generate, without modifying the plurality of XSD files, a plurality of new JAVA™ classes, wherein each of the plurality of new JAVA™ classes is generated from each new XSD file including the references to each of the plurality of XSD files sharing the same namespace;
compile each new JAVA™ class into bytecode; and
in response to compiling each new JAVA™ class into bytecode, dynamically load the bytecode for each new JAVA™ class into a corresponding new instance of ClassLoader of a JAVA™ Virtual Machine (JVM) during runtime, wherein each new instance of ClassLoader is generated for each new JAVA™ class.

13. The non-transitory computer readable medium in accordance with claim 12, wherein the computer-executable instructions cause the processor to
store the bytecode into a memory.

14. The non-transitory computer readable medium in accordance with claim 12, wherein the computer-executable instructions cause the processor to search for references in JAVA™ objects of a QName type to determine references to other XSD types.

15. The method of claim 1, wherein each new JAVA™ class is generated using a XML To JAVA™ Compiler (xjc).

16. The non-transitory computer readable medium in accordance with claim 12, wherein each new JAVA™ class is generated using a XML To JAVA™ Compiler (xjc).

17. The non-transitory computer readable medium in accordance with claim 12, wherein the computer-executable instructions cause the processor to:
generate JAVA™ objects from the plurality of XSD files using a data binding library; and
generate the plurality of XSD files from one or more XML files.

18. The non-transitory computer readable medium in accordance with claim 17, wherein the computer-executable instructions cause the processor to validate the one or more XML files against a XSD schema during runtime and report any discrepancies.

* * * * *